(12) United States Patent
Tamai et al.

(10) Patent No.: US 6,213,090 B1
(45) Date of Patent: Apr. 10, 2001

(54) ENGINE CYLINDER HEAD

(75) Inventors: Goro Tamai, Warren; James L. Miller, St. Clair Shores, both of MI (US)

(73) Assignee: Saturn Corporation, Troy, MI (US)

( * ) Notice: Subject to any disclaimer, the term of this patent is extended or adjusted under 35 U.S.C. 154(b) by 0 days.

(21) Appl. No.: 09/556,368

(22) Filed: Apr. 24, 2000

(51) Int. Cl.⁷ .................................................. F02B 31/00
(52) U.S. Cl. ............................................ 123/308; 123/315
(58) Field of Search .................................. 123/308, 315, 123/432, 188.14

(56) References Cited

U.S. PATENT DOCUMENTS

| | | | |
|---|---|---|---|
| 4,606,303 | * 8/1986 | Mezger et al. | 123/315 |
| 4,706,623 | 11/1987 | Gadefelt et al. | 123/308 |
| 5,558,061 | 9/1996 | Suminski | 123/306 |
| 5,836,284 | * 11/1998 | Oda et al. | 123/308 |
| 5,913,554 | * 6/1999 | Oda et al. | 123/308 |
| 5,983,856 | * 11/1999 | Oda et al. | 123/308 |

* cited by examiner

*Primary Examiner*—John Kwon
(74) *Attorney, Agent, or Firm*—Laura C. Hargitt

(57) ABSTRACT

A cylinder head for a four-valve per cylinder internal combustion engine comprises a bowl-shaped combustion chamber recess on a lower surface which cooperates with a piston in a cylinder to form a combustion chamber. The combustion chamber recess has first and second exhaust openings, and first and second intake openings. First and second exhaust ports extend from the first and second exhaust openings to an exhaust outlet through an exhaust side wall of the cylinder head. First and second intake ports, divided by a septum, extend from the first and second intake openings, along a curved flow path, to an intake passage. The intake passage delivers intake charge from an intake inlet in an intake side wall of the cylinder head to the first and second intake ports. The first and second intake ports have first and second intake valves to regulate flow of intake charge through the intake valve openings. The intake passage has a port protrusion including a swirl-inducing ramp, on an upstream side to redirect a portion of the intake charge entering the first intake port and inducing swirl about a stem of the first intake valve, and a back angled ramp on a downstream side so as to reduce hindrance of induced swirl.

7 Claims, 5 Drawing Sheets

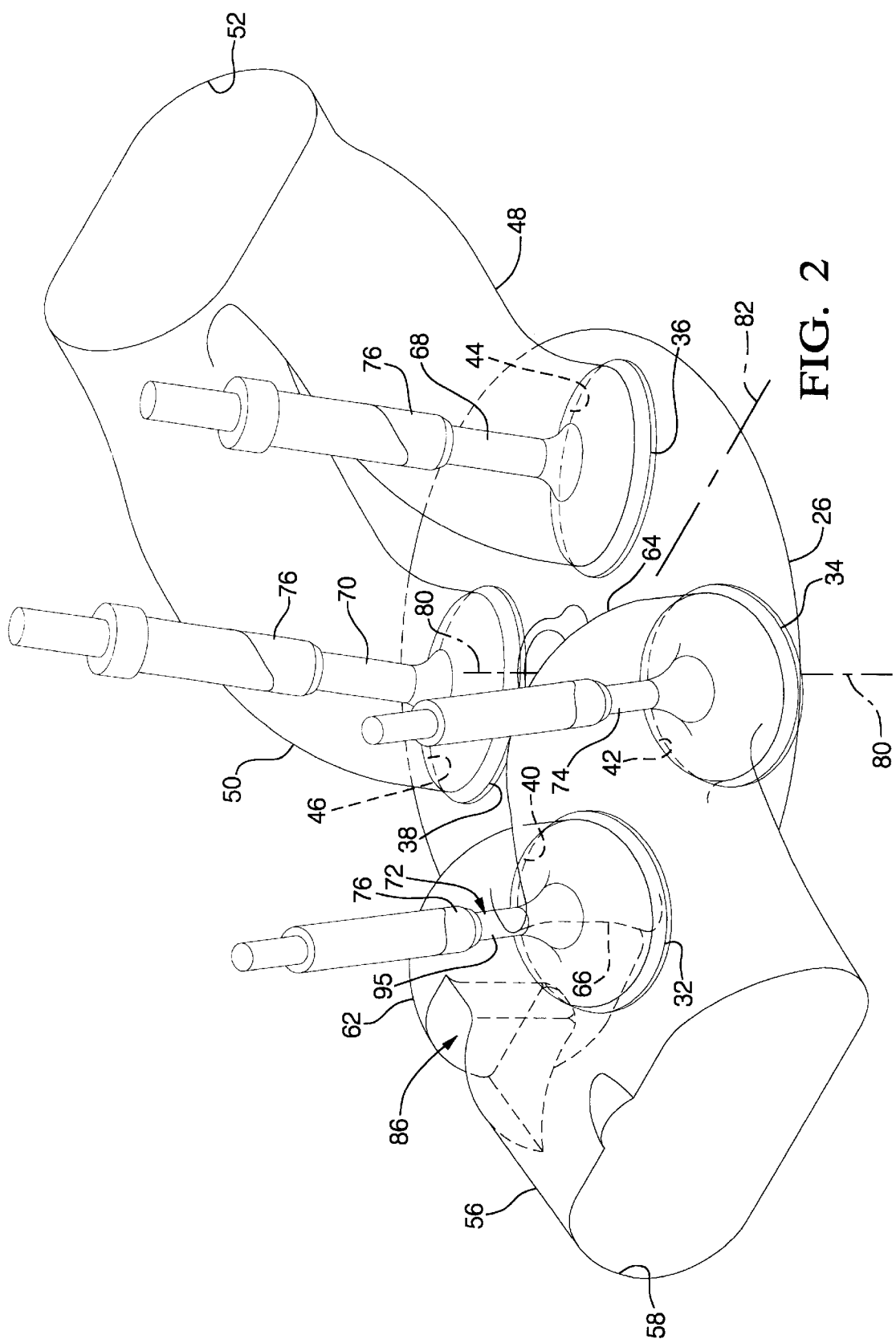

ENGINE CYLINDER HEAD

TECHNICAL FIELD

The invention relates to a cylinder head for a four valve per cylinder internal combustion engine.

BACKGROUND OF THE INVENTION

Generally to start a cold engine, a richer fuel mixture is required, which results in a majority of the exhaust emissions generated. Therefore it is desirable to design a cylinder head that can tolerate relatively lean fuel mixtures in a cold engine. It is also desirable to design an engine to accommodate relatively high levels of exhaust gas recirculant (EGR) for reducing emissions, without sacrificing a loss in combustion stability or power output. Such an increased tolerance for air dilution may be accomplished by generating charge turbulence. Research has shown that an approximately even combination of swirl, circular flow about the cylinder axis, and tumble, circular flow about an axis transverse to the cylinder axis, leads to an optimal flow condition by maximizing the dilution tolerance per total angular motion imparted to the charge. A four valve per cylinder engine tends to provide primarily tumble because the two intake valves are located symmetrically about the cylinder center, whereas a two valve per cylinder engine inherently provides swirl since the single intake valve is offset from the center of the cylinder. Therefore the two engine configurations have different hurdles to overcome to generate the desired angular motion.

Mechanisms such as variable valve and variable port actuation may generate the charge motion desired, but at increased expense. Fixed geometry structure may also generate motion, but may lead to a loss in engine power by restricting air flow. The need remains for a fixed geometry configuration that provides the proper angular motion while not impeding air flow, and therefore power output.

SUMMARY OF THE INVENTION

The present invention is directed to a cylinder head having fixed geometrical features for use in a four valve per cylinder internal combustion engine. The fixed features generate swirl motion to be added to the inherent tumble motion of a four valve per cylinder engine, without sacrificing engine power. A proper combination of swirl and tumble optimizes flow conditions, which in turn increases the tolerance for more air and EGR in the intake charge.

The cylinder head includes an intake passage which divides into a first intake port and a second intake port, with each intake port having an associated intake valve. A port protrusion projects from the intake passage and has a swirl-inducing ramp on an upstream side of the protrusion to redirect a portion of the intake charge entering the first intake port and to induce swirl about the first intake valve. The protrusion has a back angled ramp on the downstream side so as to not hinder swirl induced by the swirl-inducing ramp. Therefore the first intake port delivers intake charge to the cylinder having a swirl component about the cylinder axis, also referred to as the swirl axis.

The cylinder head may also comprise a valve shroud partially about the first intake opening into the combustion chamber to further enhance the swirl component developed by the port protrusion. The valve shroud includes a shroud wall extending into the combustion chamber and shielding a circumferential portion of the first intake opening, thereby forcing the intake charge towards the second intake valve and promoting swirl in the same direction as the swirl generated by the port protrusion. The valve shroud further includes a smooth ramp portion to blend the shroud wall into the bowl-shaped combustion chamber recess to ensure the swirl component is not hindered.

The swirl component of the intake charge generated by the fixed features of the cylinder head combines with the tumble component inherently generated by the four valve per cylinder engine to result in an angularly charged intake motion. Such angularly charged motion may lead to an optimal flow condition for tolerating increased dilution.

BRIEF DESCRIPTION OF THE DRAWINGS

FIG. 2 is a perspective view of the four valves and associated ports of the engine of FIG. 1;

DESCRIPTION OF THE PREFERRED EMBODIMENT

Figure 1:
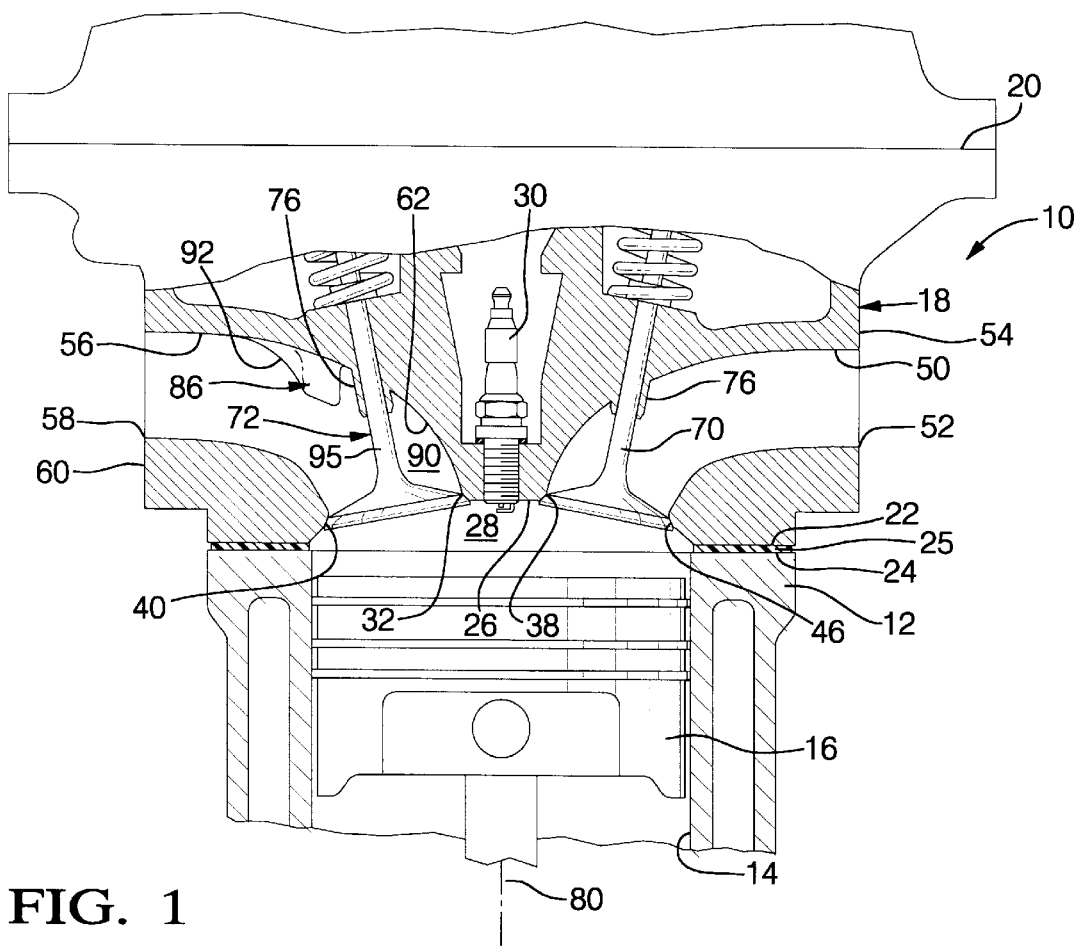
FIG. 1 is a sectional side view of a four valve per cylinder internal combustion engine embodying features of the present invention.

Referring to FIG. 1, a four valve per cylinder internal combustion engine is shown generally as 10. Engine 10 includes a cylinder block 12 having a plurality of cylinders 14, only one of which is shown. A piston 16 is provided in each cylinder 14 for reciprocation therein.

A cylinder head 18, including upper and lower surfaces 20 and 22, is mounted upon the cylinder block 12 where the lower surface 22 is seated upon an upper deck 24 of the cylinder block to close the cylinders 14 with a head gasket 25 therebetween. At each cylinder location, a combustion chamber recess 26 is formed in the cylinder head lower surface 22 which cooperates with the piston 16 to form a generally open combustion chamber 28. A spark plug 30 is mounted in the cylinder head 18 with its gap extending through the combustion chamber recess 26 along the cylinder axis 80.

Figure 8:
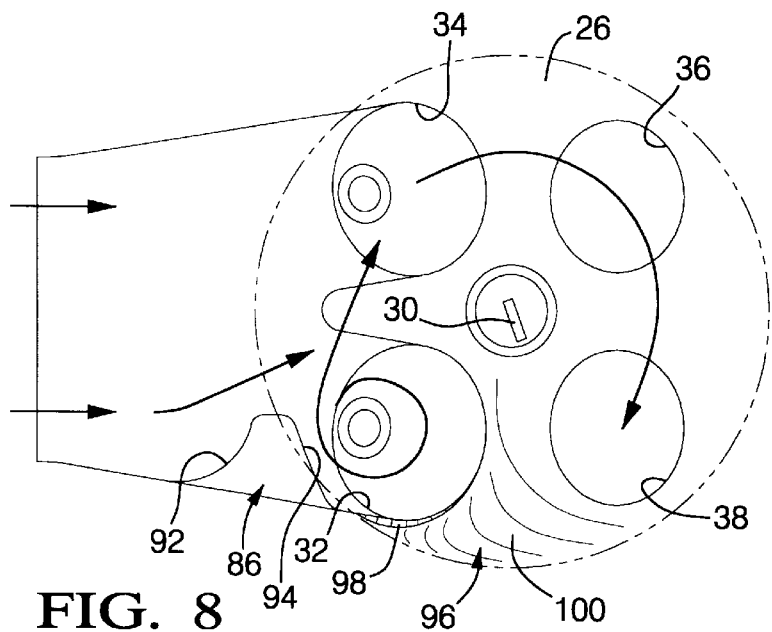
FIG. 8 is a schematic, bottom view of the lower surface of the cylinder head of FIG. 1.

As shown in FIGS. 2 and 8, the combustion chamber recess 26 of the cylinder head 18 has four openings with valve seats about each one. The openings are referred to as first intake opening 32, second intake opening 34, first exhaust opening 36, and second exhaust opening 38, with respective valve seats, first intake valve seat 40, second intake valve seat 42, first exhaust valve seat 44, and second exhaust valve seat 46.

First and second exhaust ports 48 and 50 extend from the first and second exhaust openings 36 and 38 of the combustion chamber recess 26, along a curved flow path, to a common exhaust outlet 52 through an exhaust side wall 54 of the cylinder head 18, FIG. 1. An exhaust manifold, not shown, is affixed to exhaust side wall 54.

The cylinder head 18 also includes an intake passage 56 extending from an intake inlet 58 in an intake side wall 60 of the head, having an intake manifold, not shown, affixed thereto, to a first and a second intake port 62 and 64. The first and second intake ports 62,64 are divided by a narrow septum 66 and extend along a curved flow path from the intake passage 56 to the first and second intake valve seats 40 and 42 respectively, of the combustion chamber recess 26. Intake air is delivered from the intake manifold to the combustion chamber 28 via the intake passage 56 and intake ports 62,64. The intake ports 62,64 will be described subsequently in greater detail.

In FIG. 2, first and second exhaust valves 68 and 70 are provided for the first and second exhaust ports 48 and 50, respectively, and first and second intake valves 72 and 74 are provided for the first and second intake ports, 62 and 64 respectively. Each valve 68–74 is mounted for reciprocation in the cylinder head 18 by a valve guide 76. The intake valves 72,74 operate to regulate flow of intake charge through the intake valve seats 40,42 into the combustion chamber 28, and the exhaust valves 68,70 operate to regulate exhaust gas flow out of the combustion chamber.

The particular configuration of the cylinder head 18 and intake ports 62,64 will now be described. The configuration is designed to generate angular rotation of the total intake charge as it flows about the combustion chamber 28, without hindering maximum air flow which would impede engine power. The angular rotation has a swirl component about a swirl axis 80, parallel to the cylinder longitudinal axis; it also has a tumble component about a tumble axis 82, transverse to the swirl axis 80 and approximately separating the intake valves from the exhaust valves. It is desirable to generate a resultant charge flow which has both swirl and tumble components. Tests have shown that a resultant charge rotating about an axis approximately 45 degrees to the swirl and tumble axes is preferred.

Figure 3:
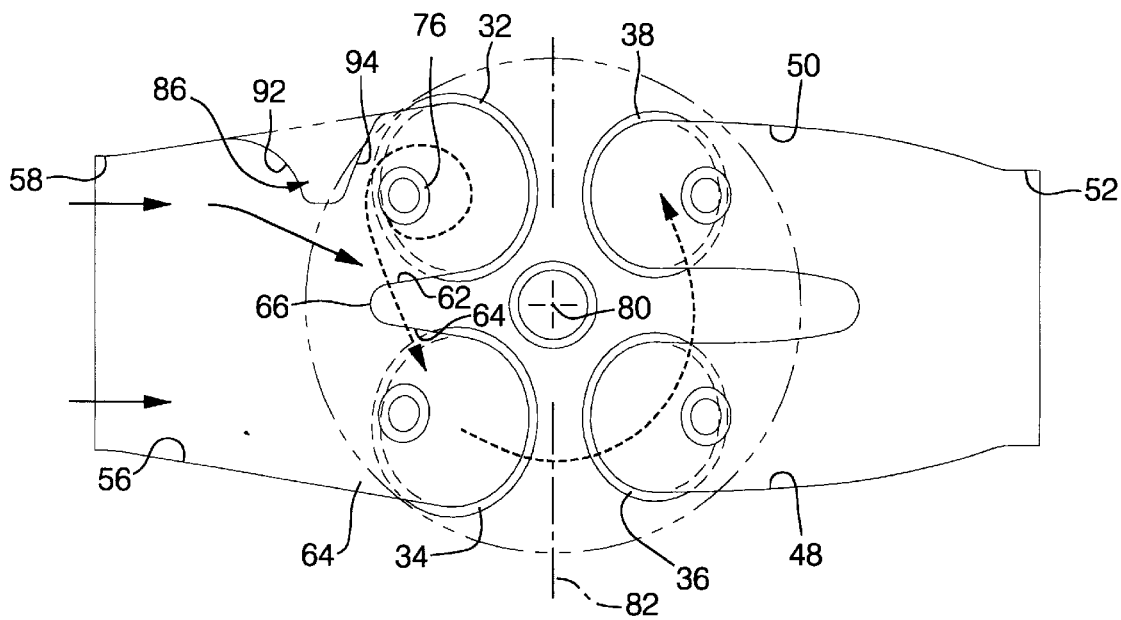
FIG. 3 is a sectional plan view of the cylinder head.
Figure 4:
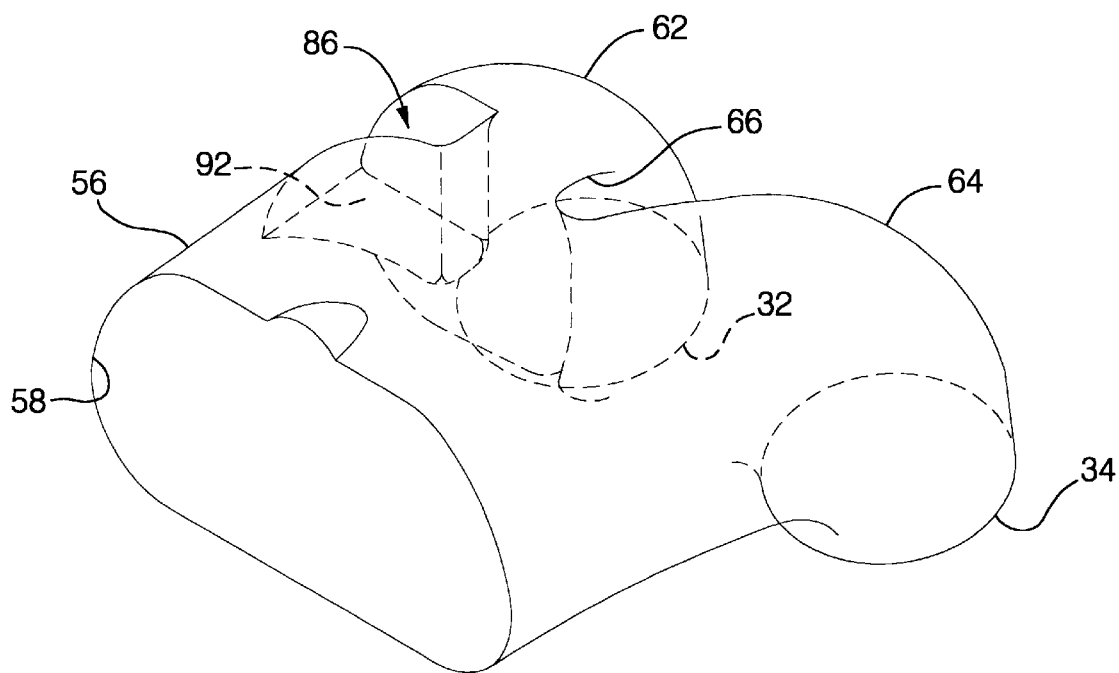
FIG. 4 is a perspective view of both intake port cores useful to illustrate features of the present invention.
Figure 5:
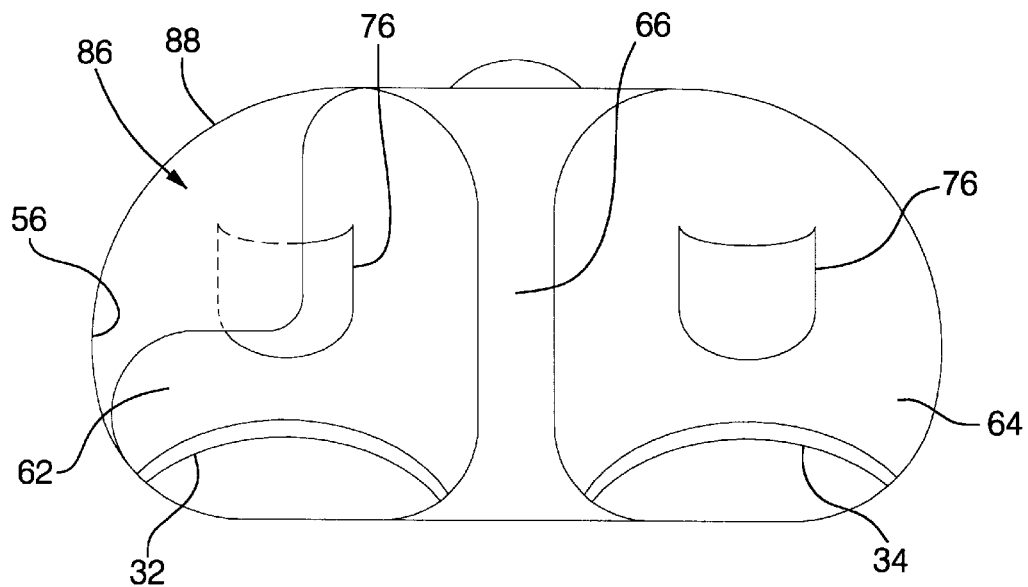
FIG. 5 is a sectional view of both intake ports as viewed from outside the engine.
Figure 6:
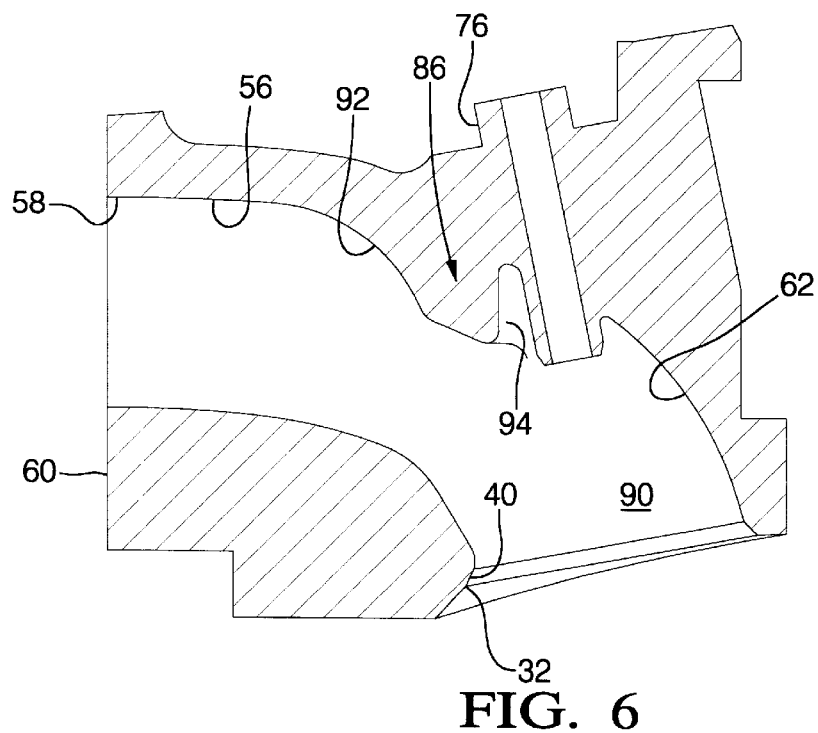
FIG. 6 is a sectional side view of the first intake port having a port protrusion.

The first intake port 62, illustrated in FIGS. 2–4, creates a counter-clockwise swirl component to the intake charge through the use of fixed structure such as port protrusion 86 where the swirl flow is illustrated in FIG. 3. The port protrusion 86 projects from an upper, outer portion 88 of the intake passage 56 and blocks approximately the upper, outer quadrant of the first intake port 62, as viewed from the intake manifold in FIG. 5. The port protrusion 86 is located upstream of the valve guide 76 and approximately where the straight intake passage 56 bifurcates and transitions to the first and second intake ports 62,64. The first intake port 62 bends in the side view of FIG. 6, to a port bowl 90, just upstream of the first intake valve seat 40. As viewed in the plan view of FIG. 3, the port protrusion 86 includes a swirl-including angled ramp 92 on the upstream side and a back angled ramp 94 on the downstream side. The swirl-inducing ramp 92 skews a portion of the intake flow entering the first intake port 62 around the first intake valve stem 95, generating a counter-clockwise swirl component of the intake charge as viewed in the plan view of FIG. 3. The downstream back angled ramp 94 is included so the port protrusion 86 does not hinder in-port swirl around the stem 95 of the first intake valve 72 in the port bowl 90. The in-cylinder swirl flows in the direction from the first intake valve 72 to the second intake valve 74 and around the cylinder 14 to the first and second exhaust valves 68,70.

The combustion chamber 28 is generally an "open" chamber, meaning the combustion chamber recess 26 is bowl shaped and does not include so-called squish-producing surfaces or chamber shrouds. The open chamber reduces the chamber surface area-to-volume ratio, and thus may decrease heat losses. Also the septum 66, or bridge between the two intake ports 62,64, is minimized in width and length. By providing an open chamber 28 and a small septum 66, there is less surface area which may be wetted when air flows over and deposits fuel thereon. This may result in less frictional flow losses for power output, as well as reduce the fuel wall-wetting area for reduced emissions.

To further enhance the swirl component and complement the effect of the port protrusion 86, the cylinder head 18 may include a valve shroud 96 partially about the first intake valve seat 40 of the first intake opening 32 as shown in FIG. 8. The shroud 96 includes a shroud wall 98 which extends downwardly, into the combustion chamber 28. The shroud wall 98 shields a circumferential portion of the first intake opening 32, thereby forcing the intake charge towards the second intake opening 34 and blocking much of the flow away from the second exhaust opening 38. The shroud wall 98 may shield about one-fourth of the circumference of the first intake valve opening 32, from the adjacent second exhaust valve opening 38 outboard to near the port protrusion 86. The close proximity of the first intake valve 72 to the shroud wall 98 effectively forces the charge air to enter the combustion chamber 28 primarily through the unshielded circumferential portion of the first intake opening 32, forcing the charge in the direction of the second intake opening 34 and inducing in-cylinder swirl. The valve shroud 96 further includes a smooth ramp portion 100 which extends from the adjacent second exhaust opening 38 to the top of the shroud wall 98 to smoothly blend the wall into the combustion chamber recess 26, reducing the swirl resistance in the combustion chamber 28 as the swirl flow revolves.

Figure 7:
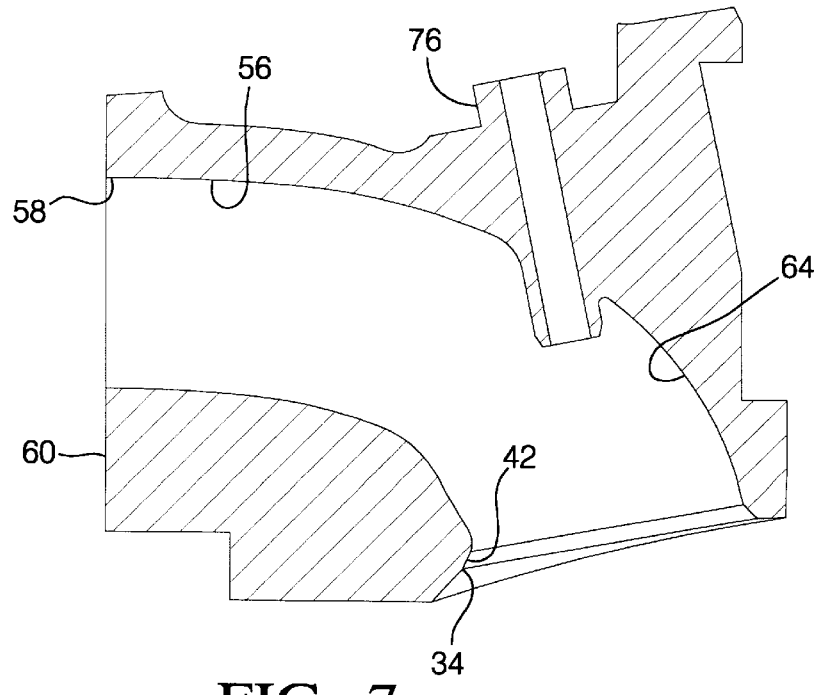
FIG. 7 is a sectional side view of the second intake port.

The second intake port 64 is a traditionally configured port with no structural changes to the geometry as shown in FIG. 7. A portion of the intake air delivered through the intake passage 56 flows through the second intake port 64 and past the second intake valve seat 42.

Figure 9:
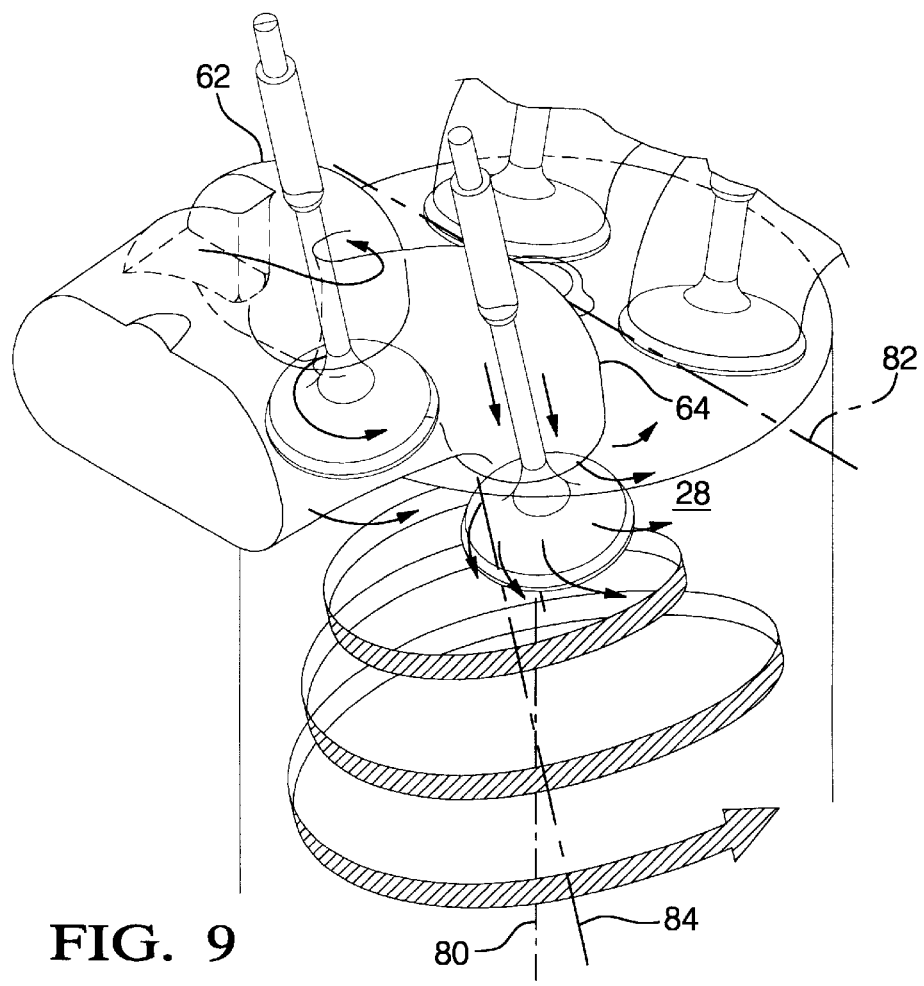
FIG. 9 illustrates the air flow out of each intake port into the cylinder and the resultant flow direction.

FIG. 9 illustrates the flow pattern of the intake charge out of the intake ports 62,64 and into the combustion chamber 28. The tumble component flows about the tumble axis 82 and the swirl component, induced by the first intake port 62, flows about the swirl axis 80. The tumble and swirl components combine resulting in a total charge angular motion about the resultant axis 84, approximately 45 degrees to the swirl and tumble axes 80,82. The resultant flow provides increased dilution tolerance for relatively leaner cold starts and higher levels of EGR dilution during warm operation. This is accomplished without sacrificing power output by providing low restriction intake ports and a generally open combustion chamber.

The foregoing description of the preferred embodiment of the invention has been presented for the purpose of illustration and description. It is not intended to be exhaustive, nor is it intended to limit the invention to the precise form disclosed. It will be apparent to those skilled in the art that the disclosed embodiment may be modified in light of the above teachings. The embodiment was chosen to provide an illustration of the principles of the invention and its practical application to thereby enable one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A four-valve per cylinder internal combustion engine, comprising:

an engine block having a plurality of cylinders with a piston provided for reciprocation in each of said cylinders, said cylinder defining a swirl axis parallel to the cylinder axis and a tumble axis transverse to said swirl axis, and a cylinder head having a lower surface seated upon said engine block to close said cylinders, a bowl-shaped combustion chamber recess for each of said cylinders which cooperates with said piston to form an open combustion chamber, a first and a second exhaust opening to said combustion chamber recess with a first and a second exhaust valve seat thereabout, a first and a second intake opening to said combustion chamber recess with a first and a second intake valve seat thereabout, a first and a second exhaust port extend from said first and second exhaust openings to an exhaust outlet through an exhaust side wall of said cylinder head and having a first and a second exhaust valve to regulate exhaust flow out of said combustion chamber, a first and a second intake port, divided by a septum, extend from said first and second intake openings, along a curved flow path, to an intake passage, delivering intake air from an intake inlet in an intake side wall of said cylinder head, said first and second intake ports having a first and a second intake valve to regulate flow of intake charge through said intake valve openings, said intake passage having a port protrusion including a swirl-inducing ramp on an upstream side to redirect a portion of the intake charge entering said first intake port and inducing swirl about a stem of said first intake valve, and a back angled ramp on a downstream side so as to not hinder induced swirl, said first and second intake ports delivering intake charge to said cylinder having a swirl component about said swirl axis and a tumble component about said tumble axis, whereby said swirl and tumble components of said intake charge combine to produce a resultant angular flow of intake charge capable of increasing dilution tolerance.

2. A four-valve per cylinder internal combustion engine, as defined in claim 1, wherein said port protrusion projects from an upper, outer portion of said intake passage, where said intake passage transitions to said first and second intake ports which bend, in side view, towards said combustion chamber.

3. A four-valve per cylinder internal combustion engine, as defined in claim 2, wherein said cylinder head further comprises a valve shroud partially about said first intake opening to further enhance said swirl component of said intake charge and complement effects of said port protrusion.

4. A four-valve per cylinder internal combustion engine, as defined in claim 3, wherein said valve shroud includes a shroud wall extending into said combustion chamber and shielding a circumferential portion of said first intake opening thereby forcing said intake charge towards said second intake opening and inducing swirl, said valve shroud further includes a smooth ramp portion to blend said shroud wall into said bowl-shaped combustion chamber recess to reduce resistance to said induced swirl.

5. A cylinder head for a four-valve per cylinder internal combustion engine, comprising:

a bowl-shaped combustion chamber recess on a lower surface which cooperates with a piston in a cylinder to form a combustion chamber, first and second exhaust openings in said combustion chamber recess with first and second exhaust valve seats thereabout, first and second intake openings in said combustion chamber recess with first and second intake valve seats thereabout, first and second exhaust ports extending from said first and second exhaust openings to an exhaust outlet through an exhaust side wall of said cylinder head and having a first and a second exhaust valve to regulate exhaust flow out of said combustion chamber, first and second intake ports, divided by a septum, extending from said first and second intake openings, along a curved flow path, to an intake passage, said intake passage delivering intake charge from an intake inlet in an intake side wall of said cylinder head to said first and second intake ports, said first and second intake ports having first and second intake valves to regulate flow of intake charge through said intake valve openings, and said intake passage having a port protrusion including a swirl-inducing ramp, on an upstream side to redirect a portion of the intake charge entering said first intake port and inducing swirl about a stem of said first intake valve, and a back angled ramp on a downstream side so as to reduce hindrance of induced swirl.

6. A cylinder head, as defined in claim 5, further comprises a valve shroud partially about said first intake opening to further enhance the induced swirl of said intake charge.

7. A cylinder head, as defined in claim 6, wherein said valve shroud includes a shroud wall extending into said combustion chamber and shielding a circumferential portion of said first intake opening thereby forcing said intake charge towards said second intake opening and inducing swirl, and a smooth ramp portion to blend said shroud wall into said bowl-shaped combustion chamber recess to ensure the induced swirl is not hindered.

* * * * *